United States Patent
Purvis et al.

(10) Patent No.: US 6,186,162 B1
(45) Date of Patent: Feb. 13, 2001

(54) LEAK DETECTION AND SHUT-OFF APPARATUS

(76) Inventors: Michael J. Purvis, 4488 Sunhill Dr., St. Louis, MO (US) 63128; J. Rodney Bryan, Jr., 604 Meadowridge Land, Kirkwood, MO (US) 63122

( * ) Notice: Under 35 U.S.C. 154(b), the term of this patent shall be extended for 0 days.

(21) Appl. No.: 09/347,768

(22) Filed: Jul. 6, 1999

(51) Int. Cl.[7] ............................. F16K 31/04; F16K 51/00
(52) U.S. Cl. ............... 137/312; 122/504.2; 122/507; 137/554; 251/129.05; 251/129.12; 251/129.13; 251/251; 251/249.5; 307/118; 340/605; 340/636; 361/178
(58) Field of Search ................... 137/78.1, 78.3, 137/312, 392, 554, 558, 387; 122/504, 504.2, 507; 251/129.06, 129.12, 129.13, 129.05, 251, 249.5; 307/118; 340/604, 605, 620, 636; 361/178

(56) References Cited

U.S. PATENT DOCUMENTS

| | | | |
|---|---|---|---|
| 3,680,831 | * 8/1972 | Fujiwara | 251/129.12 |
| 3,770,002 | * 11/1973 | Brown | 137/312 |
| 4,252,088 | 2/1981 | Frisby | 122/507 |
| 4,264,901 | 4/1981 | Petersen et al. | 340/604 |
| 4,324,268 | * 4/1982 | Jacobson | 137/312 |
| 4,428,398 | * 1/1984 | Mito et al. | 137/530 |
| 4,754,949 | * 7/1988 | Fukamachi | 251/129.03 |
| 4,845,472 | 7/1989 | Gordon et al. | 340/605 |
| 5,029,605 | 7/1991 | Dowling et al. | 137/312 |
| 5,060,859 | * 10/1991 | Bancroft | 137/78.3 |
| 5,099,867 | * 3/1992 | Emery | 137/554 |
| 5,156,190 | * 10/1992 | Staley, Jr. | 137/312 |
| 5,190,069 | 3/1993 | Richards | 137/312 |
| 5,229,750 | 7/1993 | Welch, Jr. et al. | 340/605 |
| 5,240,022 | 8/1993 | Franklin | 137/1 |
| 5,334,973 | 8/1994 | Furr | 340/605 |
| 5,428,347 | 6/1995 | Barron | 340/604 |
| 5,632,302 | 5/1997 | Lenoir, Jr. | 29/4 |
| 5,655,561 | 8/1997 | Wendel et al. | 137/79 |
| 5,713,387 | * 2/1998 | Armenia et al. | 137/312 |
| 5,877,689 | * 3/1999 | D'Amico | 137/312 |
| 6,003,837 | * 12/1999 | Raymond, Jr. et al. | 251/129.12 |

* cited by examiner

*Primary Examiner*—George L. Walton
(74) *Attorney, Agent, or Firm*—Cohn, Powell & Hind

(57) ABSTRACT

A water shut-off system incorporates a water shut-off valve utilizing a pair of adjacently disposed electrodes, a transmitter and a receiving means. The water shut-off valve is in the form of a ball valve. A timing logic causes current to flow to a valve driving motor as electric pulses. A cam means and the electric pulses allow control of current flow to the motor so that the ball valve stops moving upon completion of a ninety degree rotation;

10 Claims, 5 Drawing Sheets

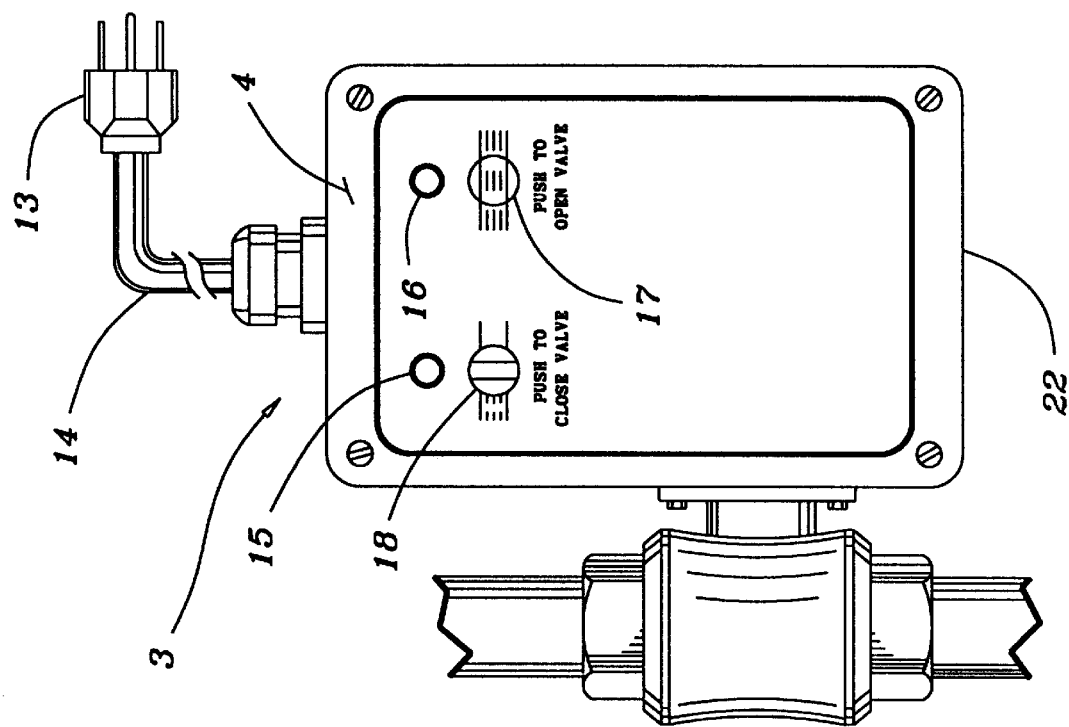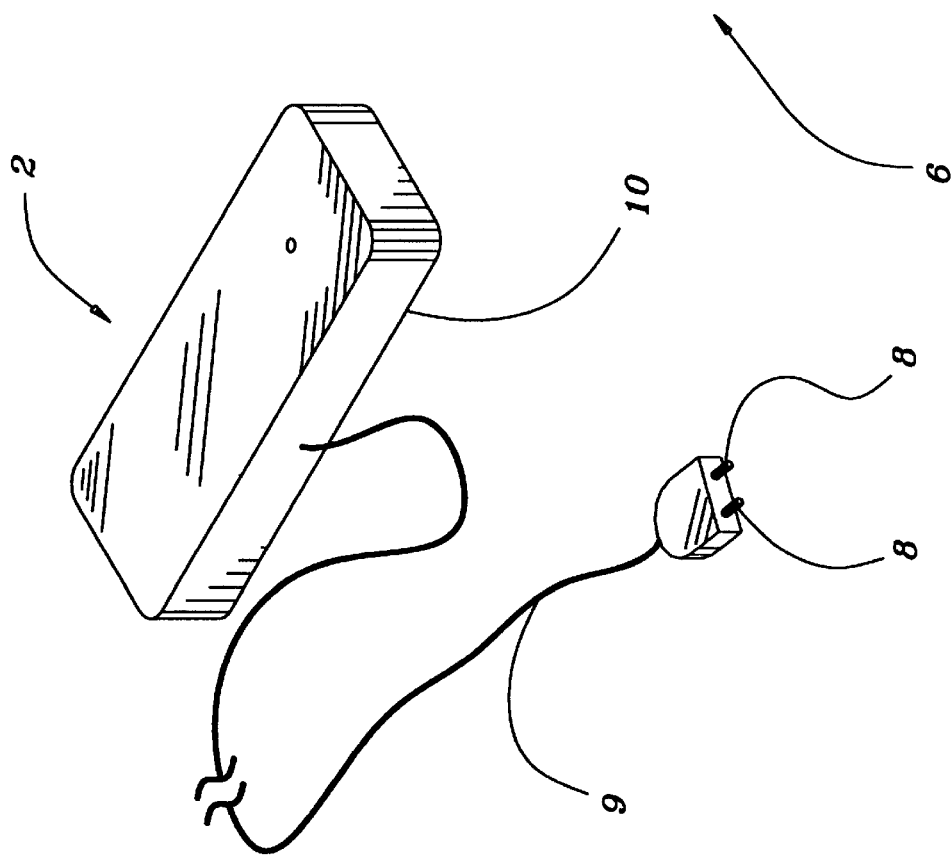

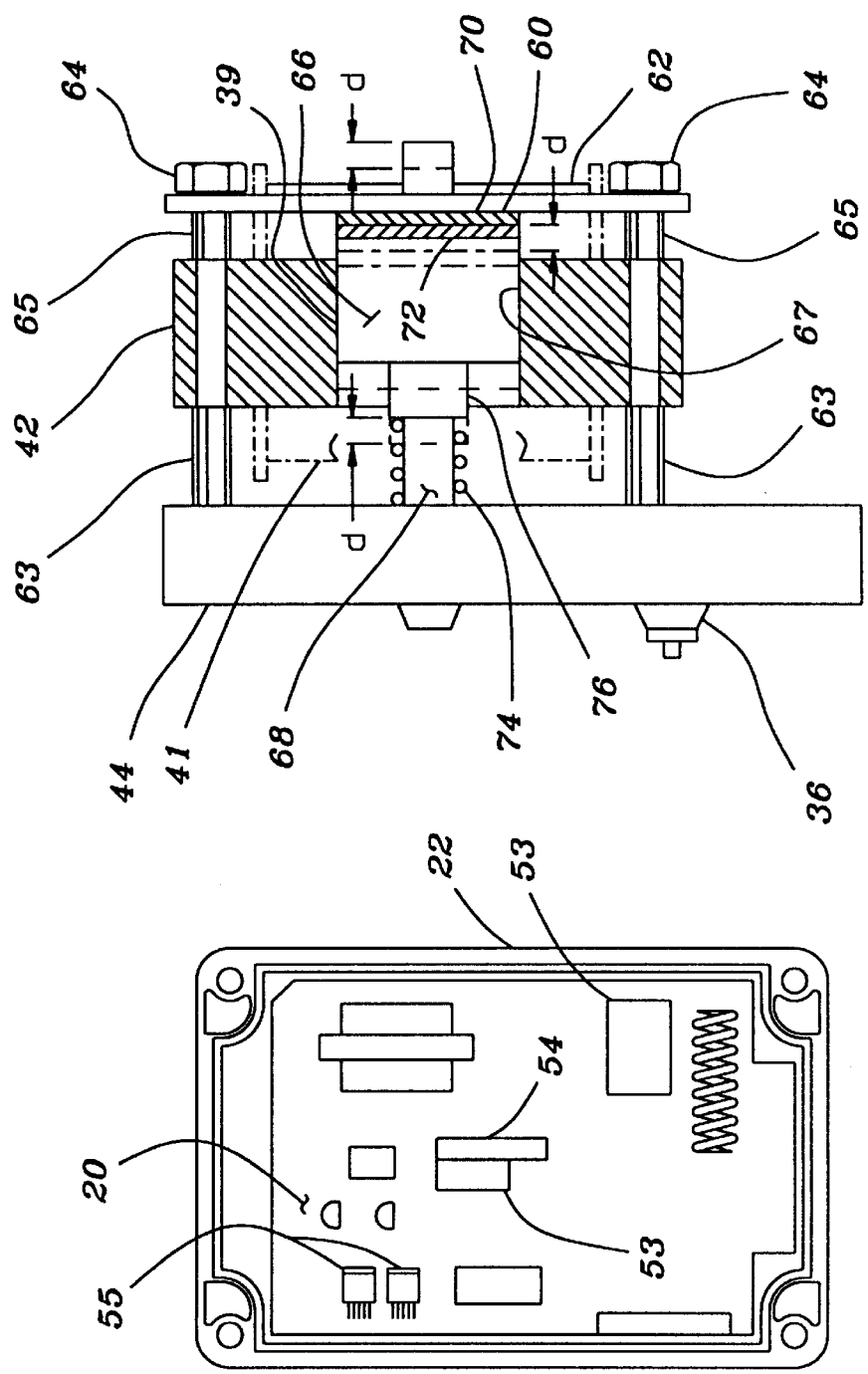

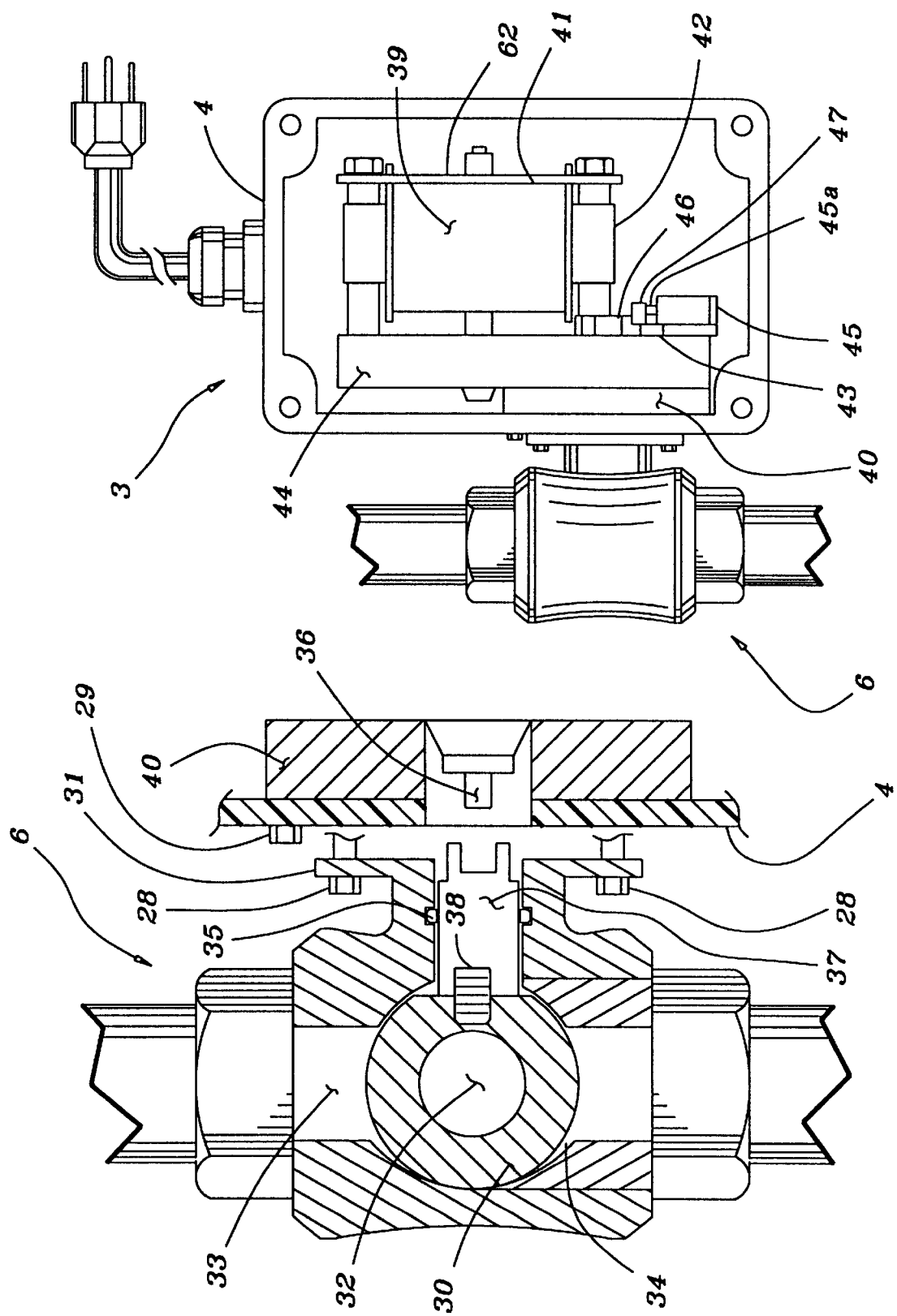

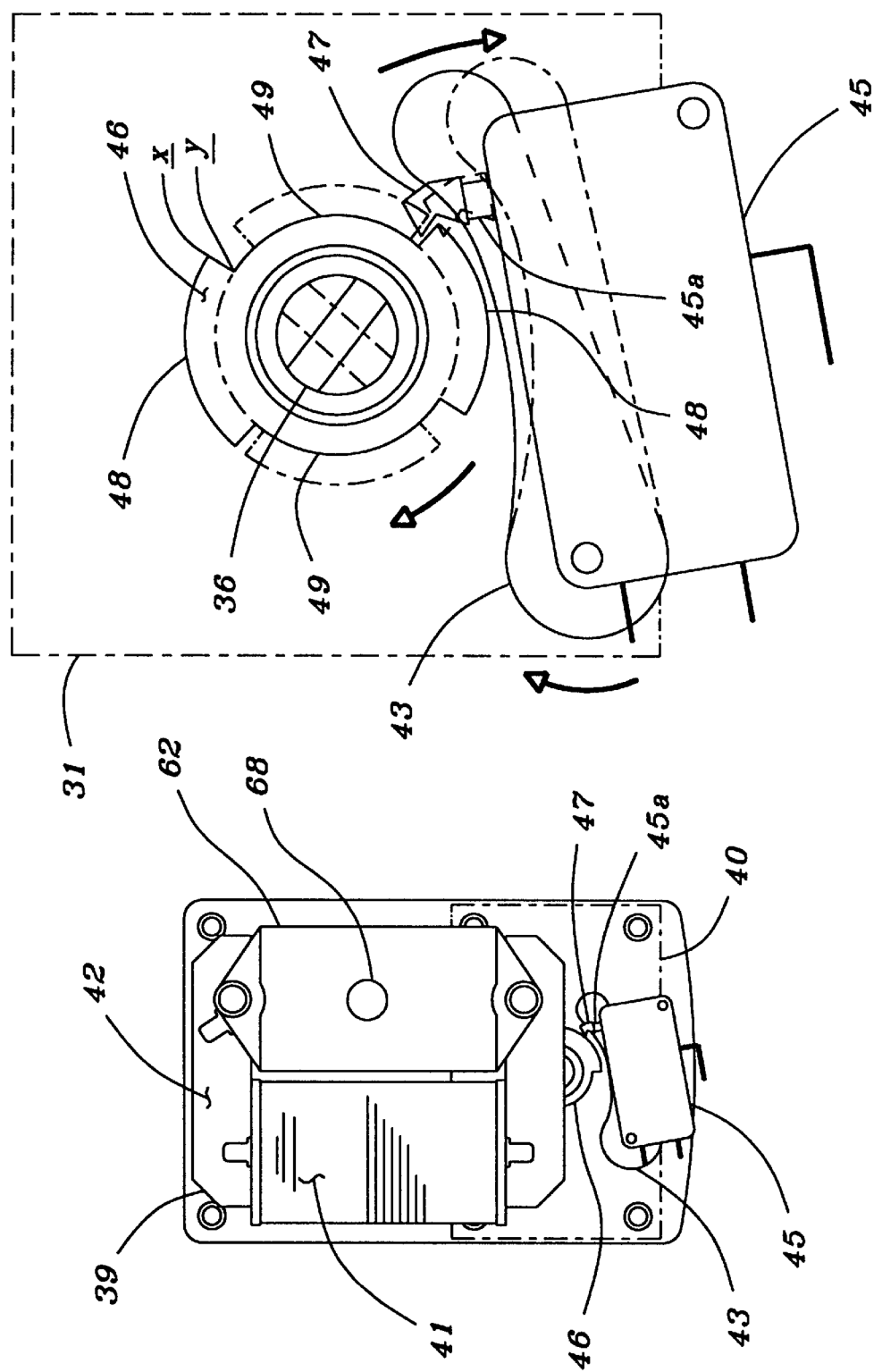

LEAK DETECTION AND SHUT-OFF APPARATUS

BACKGROUND OF THE INVENTION

This invention relates to the problem of monitoring water leakages occurring in commercial and household water systems. In a more specific aspect the invention pertains to apparatus for automatically cutting off the water supply upon the detection of a leak.

A problem of great concern is that of water damage to carpeting, flooring, walls and furniture due to water leakage resulting from faulty water heaters, defective plumbing fixtures, appliances such as washing machines and dishwashers, as well as damage resulting from such unforeseen disasters as earthquakes and fires. The seriousness of this problem is evidenced by large a volume of patents.

By way of example U.S. Pat. No. 5,240,022 discloses an automatic shut-off. U.S. Pat. No. 4,845,472 provides an apparatus which responds to the sensing of water leakage from a water line of a hot water system. U.S. Pat. No. 5,190,069 utilizes wires embedded in insulation tape carrying leak detecting liquid sensing elements. U.S. Pat. No. 5,229,750 utilizes a float and solenoid valve combination to control a cut-off in the event of a water leak. U.S. Pat. No. 5,632,302 discloses an overflow protection shut-off device for use with a water heater.

An investigation of this prior art shows that most of the patents, such as U.S. Pat. No. 4,845,472, U.S. Pat. No. 5,428,347, and U.S. Pat. No. 5,655,561 generate audible alarms to signal a detected leak. Of these U.S. Pat. No. 4,845,472, U.S. Pat. No. 5,428,347, and U.S. Pat. No. 5,655,561 additionally disclose the use of solenoid-actuated valves in the water supply line. U.S. Pat. No. 5,229,750 and U.S. Pat. No. 5,632,302 also disclose the use of solenoid-actuated valves to cut off a water supply. U.S. Pat. No. 5,029,605 points out that deposits that accumulate in pipes and valves over a period of time may impede the actuation of solenoid-type valves. Also avoiding the use of solenoid actuated valves is U.S. Pat. No. 5,240,022, which incorporates a ball valve in the water supply line. To hold the ball valve in an open position it is coupled to a rotor and a spring is attached to the rotor exerting a counterclockwise torque on the rotor. The rotor is then locked in a valve-open position by a latching arm. The end of the latching arm contacts a trip arm that receives its retaining torque from a wire spring. A trip wire actuates the trip arm. This trip wire is a metallic memory alloy wire which contracts when heated. Heating is effected by a circuit actuated by the water detector. As a consequence the latch aim is released and the rotor rotates to a valve-closed position.

Also of interest for disclosing a ball valve is U.S. Pat. No. 5,334,973. This valve controls flow into a hot water tank by using a mechanical drive in conjunction with a multilayer moisture sensor which encases the water tank liner.

While U.S. Pat. No. 5,240,022 overcomes the problems of solenoids, it is subject to several disadvantages. In addition to requiring a rotor, a latching arm, a trip arm, a trip wire and various springs, allowances had to be made for the ball valve high rotational forces, primarily due to the friction between the valve ball and the O-ring seals. In addition the ball valve must be reset to its open position by turning a knob, which frequently is not always easy. The invention herein provides an improvement which permits the use of a ball valve without the problems encountered in U.S. Pat. No. 5,240,022. All of the above mentioned patents are incorporated herein by reference.

This leak detection and shut-off apparatus is an improvement over the known prior art apparatus.

SUMMARY OF THE INVENTION

The prior art describes a water shut-off system that incorporates a water shut-off valve adapted for installation in a water supply line, and for turning off a supply of water when a leaking condition exists. That system utilizes a device consisting of a pair of adjacently disposed electrodes which conduct an electric current when water is present. Also included with the device is a radio frequency transmitter adapted to transmit a digitally encoded signal when the said electric current is sensed. A receiving means receives that radio frequency signal. On the reception of the signal the receiving means actuates an electrical circuit so that the said electrical circuit can close the water supply line shut-off valve. By the invention herein such a water shut-off system is improved.

By this invention a timing logic is incorporated in the actuated electrical circuit. This timing logic causes current flow to a motor as electric pulses. The motor has a drive shaft which is geared down to provide a reducer output shaft which rotates slowly, and that output shaft is coupled to a ball valve. The ball valve requires a rotation of ninety degrees from open to closed, and a further ninety degree rotation from closed to open. A cam operated switch is also coupled to the output shaft. The cam switch prevents current flow to the motor after a ninety degree cycle, which either closes or opens the valve. When the valve closes a reset switch must be used to actuate the timing circuit to initiate the flow of current to reopen the ball valve.

It is an aspect of this invention to provide brake means adapted to prevent further drive shaft rotation when the cam switch prevents current flow.

It is an aspect of this invention to provide that a microprocessor timed signal prevents interruption of a valve operating cycle due to "close valve" signals being received from both manual and automatic inputs within a predetermined time interval, and another aspect to provide that the status of the ball valve is stored in the microprocessor in the event of the ball valve in the event of AC power failure.

It is another aspect of this invention that the cam means is provided with cam surfaces adapted to depress and release a double throw pushbutton cam switch so that said switch alternately cuts off current flow actuated by the receiving circuit and the reset switch.

It is yet another aspect of this invention to provide that the generated electric pulse is a five second pulse and the motor drive shaft speed is eight to ten rpm.

This leak detection and shut-off apparatus is relatively simple and inexpensive to manufacture, easy to install and efficient for its intended purpose.

BRIEF DESCRIPTION OF THE DRAWINGS

FIG. 1 is an isometric view of a water detecting and transmitting unit.

FIG. 2 is a front view of a control and ball valve unit.

FIG. 3 is a view looking at the inside of the front cover showing circuit boards.

FIG. 4 is a front view partially in section showing the ball valve and spacer plate.

FIG. 5 is a front view with the plate removed to illustrate the motor and reduction gear housing.

FIG. 6 rear view showing the back of the motor and the microswitch assembly.

FIG. 7 is an enlarged view diagrammatically showing the cam means and microswitch.

FIG. 8 is a block diagram of the overall electrical system of the invention, and.

FIG. 9 is an enlarged, somewhat schematic view of the electric motor brake.

DESCRIPTION OF THE PREFERRED EMBODIMENT

Figure 8:
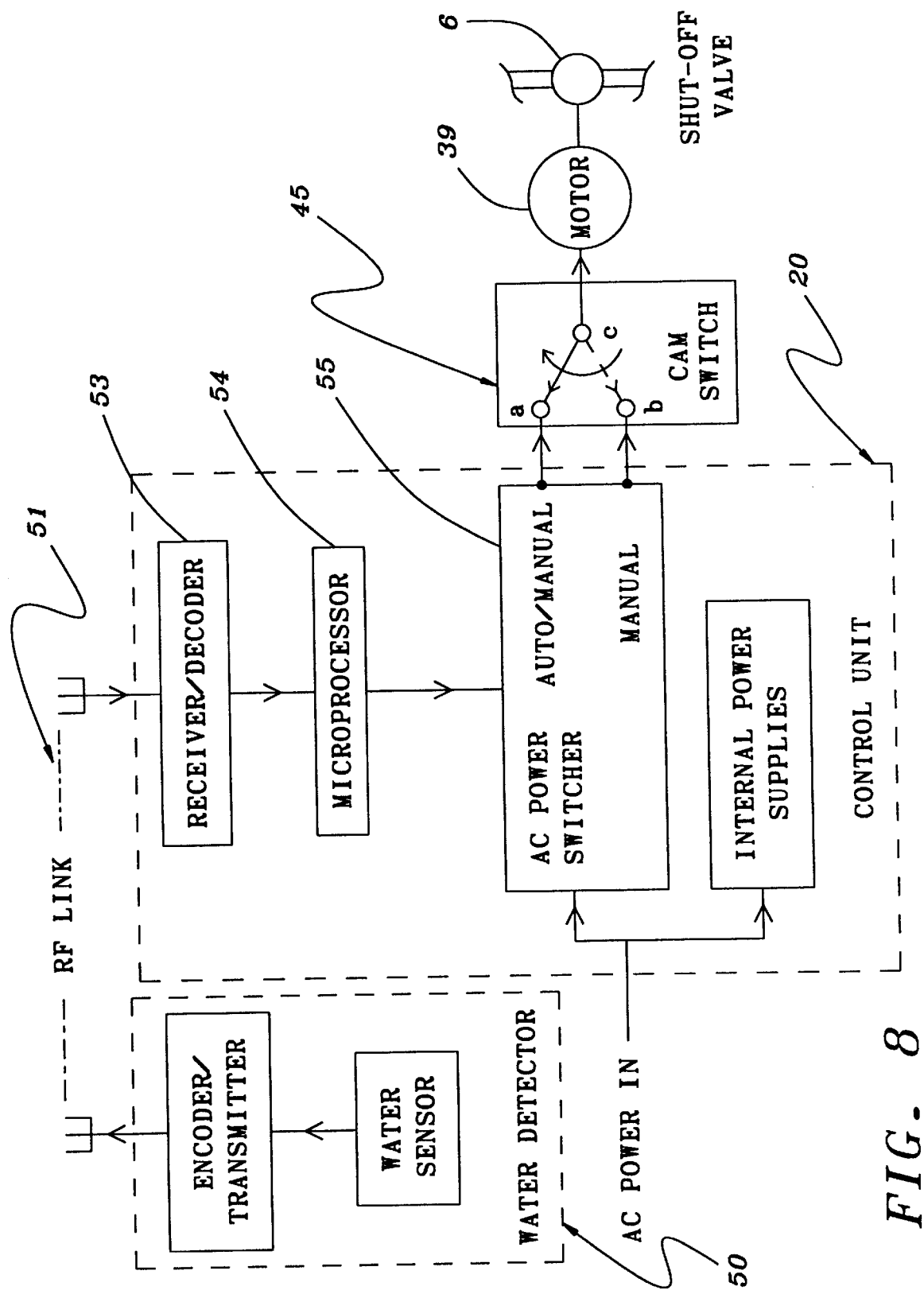

As previously observed, provided herein is a system for closing a valve to shut off a water supply in the event of a leak. The system is shown in FIGS. 1 and 2. FIGS. 1 and 2 are views of the two functioning units of the invention, illustrating their external appearances, that is, the way they look when purchased. The system includes a sensing and transmitting unit 2, including a water sensor and an encoder/transmitter together constituting a water detector, and a receiver or operating unit 3, including a motor unit and a control unit. A valve assembly including a ball valve 6 (FIG. 2) is also part of the system and all of these will be specifically described presently.

The invention herein will first be described in general terms by referring to FIGS. 1 and 2. The details will then be set forth by reference to the remaining figures. Sensing unit 2 includes two electrodes or probes 8 electrically connected by cable 9 to radio transmitting unit housing 10. The two electrodes become conductive when in contact with water. Hence they are placed in the vicinity where a leak is likely to occur. On becoming conductive, sensing unit 2 generates an encoded signal which is transmitted to the receiving unit 3. Sensing unit 2 is powered by batteries housed in transmitting unit housing 10. The receiving unit 3 mounted in housing 4 includes a motor 39 (FIG. 5), and the receiving unit and the motor are powered by the 110 VAC building current through plug 13 and power cord 14 as shown in FIG. 2. Further, showing on the face of the motor control unit housing top 22 are a valve position indicator lights 15 (green for open) and 16 (red for closed), a reset membrane switch 17 for reopening the valve, and an override membrane switch 18 which can be used to close the valve.

Referring now to FIG. 3, a circuit board 20, constituting a part of the control unit, is mounted inside the top 22 of receiving unit housing 4. Circuit board 20 includes a microprocessor 54 to be discussed shortly and a receiving circuit such as a superheterodyne radio receiver or other conventional receiving circuit which detects and decodes the signal received from sensing unit 2, by means of a receiver/decoder 53. The circuit board 20 also includes a semiconductor AC power switcher 55 which actuates motor 39 as will also be described in more detail.

The ball valve 6 is conventional, but it is illustrated in FIG. 4 so that the coupling employed for its attachment to receiving unit 3 can be visualized more readily. The valve includes the ball 30 whose opening 32 has a diameter approximating the diameter 33 of the water pipe. Ball 30 is seated in valve seat 34 which is provided with suitable O-ring seals such as 35. To adapt the ball 30 to the reducer output shaft 36 so that the ball can be rotated thereby, stirrup member 37 is connected to the ball by bolt 38 or other means. Also, the tip of reducer output shaft 36 is shaped so that it slidably fits in the stirrup of stirrup member 37. In order to mount ball valve 6 on the motor housing 4, a spacer 40 is employed as illustrated in FIG. 4. As shown, the ball flange 31 is attached to the spacer 40 by four bolts 28. The spacer is attached to the housing body 4 and the gear reducer 44 by two bolts 29 and also stabilizes the unit when the motor is running.

Motor 39 can best be seen in FIG. 6. It includes a coil or windings 41 and iron core 42. As shown in FIG. 5 reduction gearing 44 reduces drive shaft speed from about 3,000 rpm to less than 10 rpm, say 8 or 9 rpm.

Also housed in housing 4, as shown in FIGS. 5–7 as part of the control unit is a cam means coupled to AC motor 39. The cam means includes cam wheel 46 providing the cam surfaces, and a single pole changeover microswitch 45 having a pivoted detent or pawl 43 having an outstanding tip 47 engageable with the microswitch button 45a which can best be seen in FIG. 7. On referring to FIG. 7 it will be seen that cam wheel 46 has two radially elevated surfaces 48 and two radially recessed surfaces 49. When the cam wheel 46 rotates ninety degrees the positions of those four surfaces are reversed as illustrated by the phantom lines in FIG. 7. The direction of rotation of cam wheel 46 is shown by the arrow in FIG. 7. It is to be noted that each time detent 43 moves from a higher point x to a lower point y, the microswitch 45 is thrown or tripped. Each time the switch is thrown, current to the motor is cut off and the motor 39 stops. This power cut-off occurs each time the gear reducer output shaft 36 rotates ninety degrees.

In the embodiment shown, the motor 39 is provided with a brake assembly 60 as shown in FIG. 9. The motor 39 is mounted between the gear reducer 44 and mounting plate 62 by bolts 64 which pass through and, by means of spacers 63 and 65, locate the motor core 42. The motor core includes an opening 67 in which the motor armature 66 rotates by virtue of the motor shaft 68 mounted between the gear reducer 44 and the mounting plate 62. As shown, a clutch pad 70 is fixedly attached to the inside of the mounting plate 62 and a similar clutch pad 72 is mounted to the end of the motor armature. A compression spring 74, disposed about the motor shaft 68, extends between the gear reducer 44 and the armature boss 76. When the motor 39 is deenergized, the clutch brake pads are engaged. However, when the coil is energized, the armature is pulled into the core opening a distance shown by "d", which compresses the spring 74 and disengages the clutch brake pads permitting the motor to rotate. At 8 rpm, the cam wheel 46 rotates through one quadrant in just under 2 seconds. The pulse delivered to the motor is 5 seconds. Thus, to ensure that the valve does not partially close or open due to inertial and other effects, the brake prevents further drive shaft rotation after the cam switch cuts off the power to the motor.

Having described the component parts or hardware foaming this invention its operation will now be discussed. Referring to the block diagram FIG. 8, the invention includes three units, water detector 50, control unit 20, and cam switch 45. Initially, with the ball valve open, cam switch 45 is set to position a-c and motor 39 is stationary. Upon detection of a water leak, water detector 2 sends an encoded signal via an RF link means 51 to the receiver decoder 53 which in turn sends a signal to microprocessor 54 in the control unit timing circuit. The microprocessor 54 in the control unit is quiescent until it receives a signal from either the water detector 50 or the pushbutton of the membrane switch 18 in FIG. 2. Either of these two signals initiates a 5 second power pulse from the microprocessor which is fed to motor 39 via the AC power switcher 55 and the cam switch a-c path. Motor 39 then rotates through ninety degrees, turning the ball valve off, while cam wheel 46 and microswitch detent 47 change cam switch (the microswitch) 45 from position a-c to b-c thus interrupting power and arresting the motor.

To open the ball valve, the manual "press to open" or membrane reset button 17 FIG. 2 must be momentarily pressed. Microprocessor 54 then responds by generating a 5 second timing pulse which is received by the AC power switcher 55 and passed on to motor 39 through cam switch 45, now in position b-c. Motor 39 again rotates through ninety degrees, turning the ball valve on, restoring the cam switch position to path a-c as detent 47 rises, again stopping the motor. If for any reason it now becomes necessary to close the ball valve manually, the "press to close" membrane switch 18 (FIG. 2) can be momentarily pressed. The AC power switcher 55 then operates as previously stated, in a manner similar to its having received a "close valve" signal from the water detector 2. Status light 16 and indicator lights 17 and 18 (FIG. 2) are provided to show whether the ball valve is open or closed.

The microprocessor 54 also performs two other functions benefitting the operation of the leak detecting apparatus. The first is to introduce a delay of a few seconds time, greater than 5 seconds, in responding to sequential "valve closed" and "valve open" pushbutton operations. This short delay ensures that the 5 second ball valve operating cycle, once initiated, is not interrupted by premature or redundant push button inputs. Should a potential signal conflict ever occur (a race condition) due to a water detector "close valve" signal and a manual "close valve" signal being issued, the first signal received is processed with an uninterruptible 5 second delay, thus avoiding an incompleted valve closing cycle. The second function is to store in internal logic the status of the ball valve (whether open or closed) in the event of an AC power failure. This logic function ensures correct system operation when power is restored.

Having been given the teachings of this invention ramifications and will occur to those skilled in the art it being understood that by making detailed reference to a preferred embodiment, such detail is to be understood in an instructive sense rather than in any restrictive sense, many other variants being possible within the scope of the claims hereunto appended.

We claim as our invention:
What is claimed is:

1. An improvement in a water shut-off system that incorporates, (a) a water shut-off valve adapted for installation in a water supply line, and for turning off a supply of water when a leaking condition exists, (b) a pair of adjacently disposed electrodes which, when in contact with water, conduct an electric current, (c) a radio frequency transmitter adapted to transmit an encoded radio frequency signal in response to the electric current so conducted, and (d) a receiving means adapted to receive the radio frequency signal from said transmitter, and, upon its reception to actuate an electrical current adapted to supply power to close the water supply line shut-off valve, the improvement in said water shut-off system including:

(1) a timing logic in the actuated electric circuit adapted to cause current to flow as electric pulses;
   (2) a motor in the actuated electric circuit adapted to be energized by the electric pulses, said motor having a drive shaft adapted to be driven by each electric pulse when the motor is energized;
   (3) reduction gearing coupled to the motor drive shaft to convert motor drive shaft speed to a reduction gearing output shaft speed which is reduced;
   (4) a water shut-off valve in the form of a ball valve adapted to rotate ninety degrees from open to closed positions;
   (5) coupling means connecting the ball valve to the output shaft of the reduction gearing so that the ball valve is rotated by the motor;
   (6) cam means coupled to the reduction gearing output shaft, the cam being adapted to trip a switch to prevent current flow to the motor upon completion of a ninety degree rotation;
   (7) a reset switch adapted to activate the timing logic to cause current flow to the actuated circuit to reopen the ball valve.

2. The improved water shut-off system of claim 1 including brake means adapted to become disengaged when the motor is energized and to become engaged when the motor is deenergized to prevent further drive shaft rotation when the cam switch prevents current flow.

3. The improved water shut-off system of claim 1 wherein a timing circuit is provided which includes a microprocessor.

4. The improved water shut-off system of claim 1 wherein a double throw cam switch is provided and the cam means is provided with cam surfaces adapted to depress and release the double throw pushbutton cam switch so that said switch alternately cuts off current flow actuated by the receiving circuit and the reset switch.

5. The improved water shut-off system of claim 1 wherein the generated electric pulse is a five second pulse and the motor drive shaft speed is eight to ten rpm.

6. The improved water shut-off system of claim 1 wherein the ball valve has an opening therethrough the size of the water pipe opening.

7. The improved water shut-off system of claim 1 wherein the ball valve is installed in a main water line leading into a building.

8. The improved water shut-off system of claim 1 wherein the ball valve is installed in a water line leading to a washing machine.

9. The improved water shut-off system of claim 1, wherein a microprocessor timed signal prevents interruption of a valve operating cycle due to "close valve" signals being received from both manual and automatic inputs within a predetermined time interval.

10. The improved water shut-off system of claim 1, wherein the status of the ball valve is stored in a microprocessor in the event of AC power failure.

* * * * *